US011002135B2

(12) United States Patent
Pastorino et al.

(10) Patent No.: US 11,002,135 B2
(45) Date of Patent: May 11, 2021

(54) ROCK BOLT INSTALLATION TOOL

(71) Applicant: EPIROC DRILLING TOOLS AB, Fagersta (SE)

(72) Inventors: Paolo Ettore Pastorino, Johannesburg (ZA); Adrian Berghorst, Johannesburg (ZA)

(73) Assignee: EPIROC DRILLING TOOLS AB, Fagersta (SE)

( * ) Notice: Subject to any disclaimer, the term of this patent is extended or adjusted under 35 U.S.C. 154(b) by 0 days.

(21) Appl. No.: 16/493,385

(22) PCT Filed: Mar. 23, 2018

(86) PCT No.: PCT/ZA2018/050014
§ 371 (c)(1),
(2) Date: Sep. 12, 2019

(87) PCT Pub. No.: WO2018/195565
PCT Pub. Date: Oct. 25, 2018

(65) Prior Publication Data
US 2020/0011177 A1 Jan. 9, 2020

(30) Foreign Application Priority Data
Apr. 18, 2017 (ZA) .................................. 2017/02657

(51) Int. Cl.
*E21D 20/00* (2006.01)
*E21D 21/00* (2006.01)
(Continued)

(52) U.S. Cl.
CPC ......... *E21D 20/003* (2013.01); *E21D 20/025* (2013.01); *E21D 21/008* (2013.01);
(Continued)

(58) Field of Classification Search
CPC ................ E21D 21/00; E21D 21/0026; E21D 2021/0073; E21D 21/008; E21D 20/02; E21D 20/023
(Continued)

(56) References Cited

U.S. PATENT DOCUMENTS 4,156,236 A * 5/1979 Conkle ................. E21F 17/185
340/690
4,511,289 A * 4/1985 Herron .................... E21D 20/00
405/259.3
(Continued)

FOREIGN PATENT DOCUMENTS

AU 533463 B2 11/1983
CA 2452271 A1 6/2005
(Continued)

OTHER PUBLICATIONS

International Search Report, dated Jul. 12, 2018, from corresponding PCT application No. PCT/ZA2018/050014.

*Primary Examiner* — Edwin J Toledo-Duran
(74) *Attorney, Agent, or Firm* — Nixon & Vanderhye

(57) ABSTRACT

A tool to aid in the installation of a rock bolt assembly in a rock hole which includes a drive shaft having a proximal end, which is adapted to engage with a drilling rig, and a distal end which includes a recess which is adapted to receive a trailing end portion of the rock bolt and which has a first seat against which an axially pre-set component of the rock bolt assembly abuts, a tubular sleeve telescopically engaged with the shaft which has a first end, which is adapted to receive an axially moveable component of the rock bolt assembly and which has a second seat against which the axially moveable component abuts, and a second end, wherein the sleeve is reciprocally moveable relatively to the shaft between a biased forward position in which the axially pre-set component and the axially moveable com-
(Continued)

ponent are spaced, and a retracted second position in which the axially pre-set component engages or connects to the axially moveable component.

18 Claims, 3 Drawing Sheets

(51) Int. Cl.
  *E21D 20/02* (2006.01)
  *B23B 51/00* (2006.01)
  *F16B 13/00* (2006.01)
(52) U.S. Cl.
  CPC ...... *B23B 51/0027* (2013.01); *E21D 21/0093* (2013.01); *F16B 13/004* (2013.01)
(58) Field of Classification Search
  USPC ......... 405/259.1, 259.2, 259.3, 259.4, 259.5, 405/259.6; 411/55, 8, 63, 64, 65, 70, 71, 411/15; 73/151, 784, 84, 845, 841
  See application file for complete search history.

(56) References Cited

U.S. PATENT DOCUMENTS

| | | | | | |
|---|---|---|---|---|---|
| 4,763,396 | A | * | 8/1988 | Fischer | F16B 13/00 29/458 |
| 5,033,307 | A | * | 7/1991 | Uhri | E21B 47/04 73/784 |
| 5,042,888 | A | * | 8/1991 | Shinjo | F16B 13/0858 411/54 |
| 6,109,578 | A | * | 8/2000 | Guthrie | A63B 29/024 248/231.9 |
| 6,283,426 | B1 | * | 9/2001 | Guthrie | A63B 29/024 248/231.21 |
| 10,060,809 | B1 | * | 8/2018 | Hoffman | E21D 21/004 |
| 2012/0230774 | A1 | * | 9/2012 | Podesser | E21D 21/0033 405/259.1 |
| 2020/0011177 | A1 | * | 1/2020 | Pastorino | E21D 20/025 |

FOREIGN PATENT DOCUMENTS

| | | |
|---|---|---|
| WO | 2012167308 A1 | 12/2012 |
| WO | 2013104021 A1 | 7/2013 |
| WO | 2014205578 A1 | 12/2014 |

* cited by examiner

ROCK BOLT INSTALLATION TOOL

FIELD OF THE INVENTION

This invention relates to a tool that is engaged with a drilling rig to aid in the axially aligned insertion of a rock bolt in a pre-drilled rock hole.

BACKGROUND OF THE INVENTION

In a typical rock bolt installation, a leading end of a rock bolt is at least partially inserted into a rock hole and a trailing end of the rock bolt is engaged with a complementary formation of a drill rig in order to install the rock bolt into the rock hole. To increase stability and to ensure that the rock bolt is maintained in axial alignment with the rock hole, the drill rig is often provided with a prop which engages with a face of the rock bed into which the rock bolt is inserted onto which several guide rings are engaged, longitudinally spaced. It is through these rigs that the rock bolt passes to guide the bolt into the hole without bending.

Often, these guide rigs are removed to remove restoration on the passage of a rock bolt with an associated faceplate or the like.

Without guiding formations, as the rock bolt is inserted into the rock hole, the percussive force of the drill rig concentrated on the trialing end of the rock bolt causes the rock bolt to bend which compromises the rock bolt installation.

SUMMARY OF INVENTION

A tool to aid in the installation of a rock bolt assembly in a rock hole which includes a drive shaft having a proximal end, which is adapted to engage with a drilling rig, and a distal end which includes a recess which is adapted to receive a trailing end portion of the rock bolt and which has a first seat against which an axially pre-set component of the rock bolt assembly abuts, a tubular sleeve telescopically engaged with the shaft which has a first end, which is adapted to receive an axially moveable component of the rock bolt assembly and which has a second seat against which the axially moveable component abuts, and a second end, wherein the sleeve is reciprocally moveable relatively to the shaft between a biased forward position in which the axially pre-set component and the axially moveable component are spaced, and a retracted second position in which the axially pre-set component engages or connects to the axially moveable component.

The axially pre-set component may be nut or the like.

The axially moveable component may be a spherical seat.

The tool may include a spring which is interposed between a stop element on the drive shaft and the second end of the sleeve.

The distal end of the drive shaft may be adapted with a threaded male or female section.

The recess may be adapted in a hex shape to receive a hex shaped nut.

BRIEF DESCRIPTION OF THE DRAWINGS

The invention is further described by way of examples with reference to the accompanying drawings in which.

DESCRIPTION OF PREFERRED EMBODIMENTS

Figure 2:
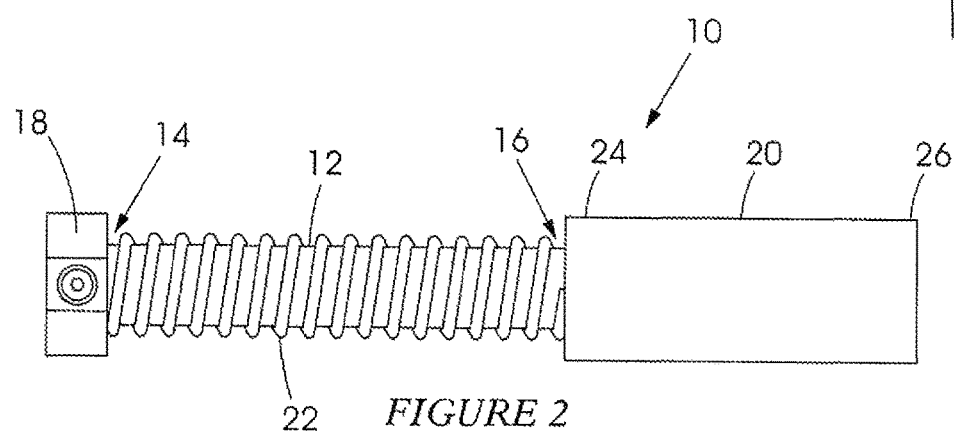
FIG. 2 is a view from one side of a portion of a rock bolt assembly in FIG. 1.
Figure 3:
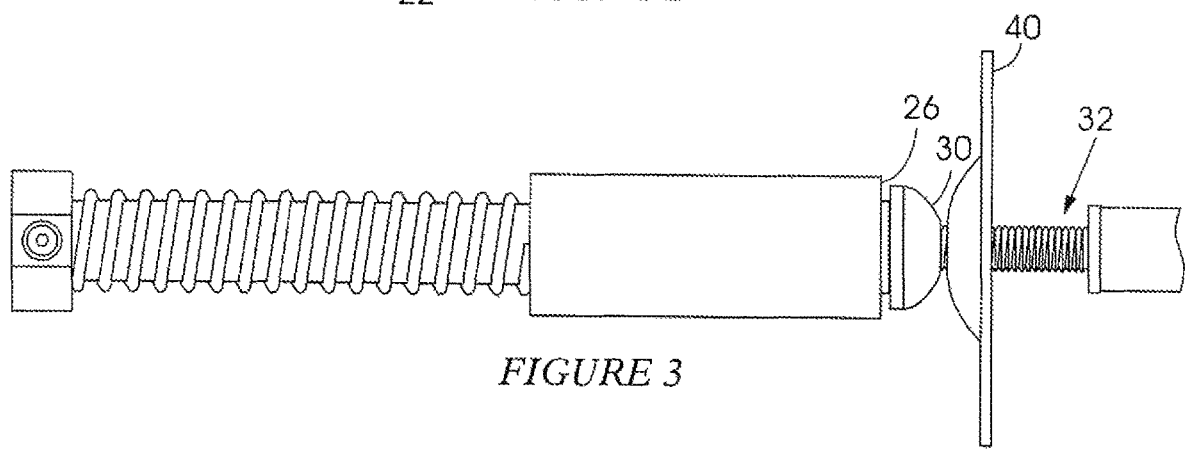
FIG. 3 is a view from one side of a rock bolt installation tool according to the invention engaged with a trailing end of a rock bolt.

FIG. 2 illustrates a rock bolt installation tool 10 according to the invention. The tool 10 includes a drive shaft 12 having a proximal end 14 and a distal end 16. A stop element 18 is provided, engaged at or towards the proximal end 14. A sleeve 20 is telescopically engaged with the shaft 12 and is biased relative to the shaft by means of a spring 22 interposed between a second end 24 of the sleeve 20 and the stop element 18.

Figure 1:
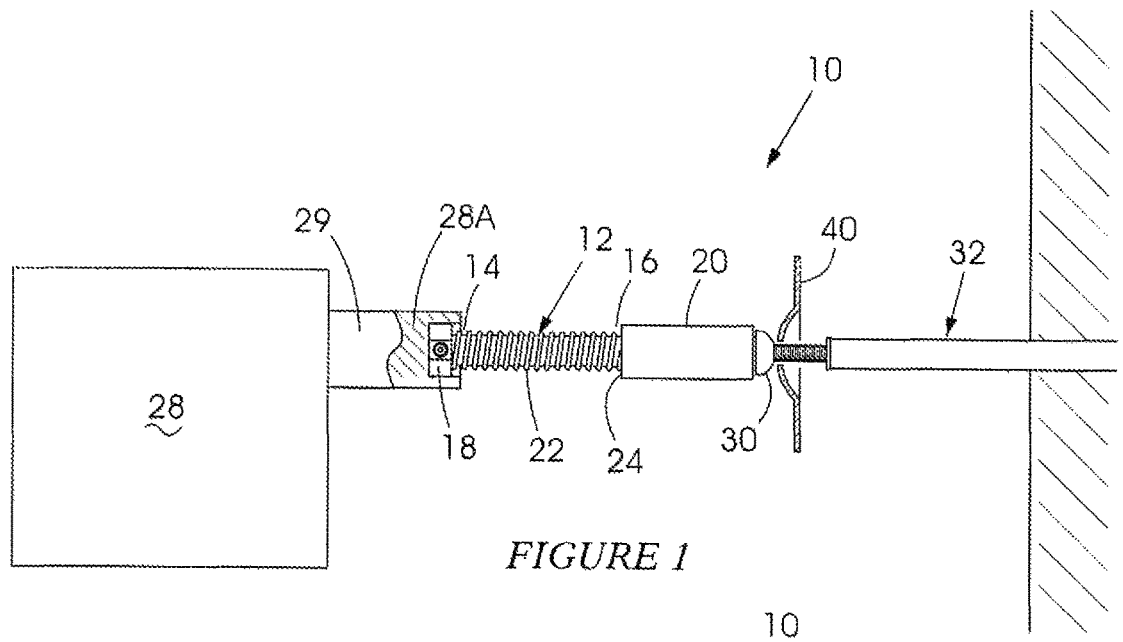
FIG. 1 is a view from one side of a rock bolt installation including a rock bolt installation tool according to the invention.

The proximal end 14 of the shaft 12 is adapted to engage with a drilling rig 28 (see FIG. 1). The proximal end can be adapted either with a male or female threaded adaptor that engages with a complementary formation on the drive means 29 of the drill rig. In this example, the proximal end has a female threaded formation.

A first end 26 of the sleeve 20 is adapted to receive an axially moveable component. The component of this example is a spherical seat 30 of a rock bolt assembly 32.

The rock bolt assembly 32 (see FIG. 4) includes a rock bolt 34, having a leading end 34A and a trailing end 34B. The rock bolt is inserted into a rock hole 36 leading end first, at rock face 38. Towards the trailing end 34B the rock bolt 32 carries a domed face plate 40, the spherical seat 30 and optimally, a load indicator 33. An axially pre-settable component shown here as a hexagonal nut 42, is threadedly engaged with a threaded end section of the rock bolt 32. The spherical seat 30 is disposed between the domed faceplate 40 and the nut 42.

The distal end 14 of the drive shaft 12 includes a recess 44 which is adapted to receive the trailing end 34B of the rock bolt 34 and includes a first seat 46, against which the nut 42 abuts. In a preferred embodiment the recess 44 is adapted in a hex shape to snugly receive the hex shaped nut 42. The sleeve 20 includes a second seat 48 which is recessed within the first end rim of the sleeve. It is against this second seat that the spherical seat abuts.

Figure 4:
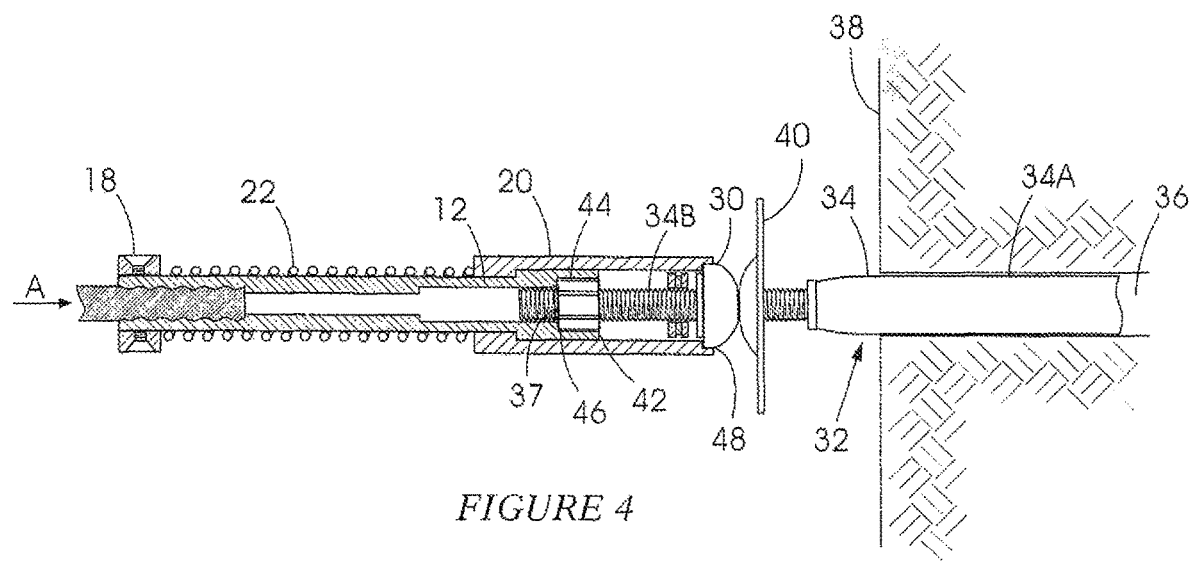
FIG. 4 illustrates a rock bolt installation tool, partially sectioned, in a biased forward positon according to the invention.

In use, the tool 10 is engaged with the drill rig 28 and the trailing end 34B of the rock bolt 34 with the nut 42 abutting the first seat 46 and the spherical seat contacting the second seat 48. The leading end 34A of the rock bolt 34 is inserted into the rock hole 36 and the sleeve 20 is forward biased position relatively to the shaft 12 as shown in FIG. 4. In this position, the nut 42 is spaced from the spherical seat 30.

Figure 5:
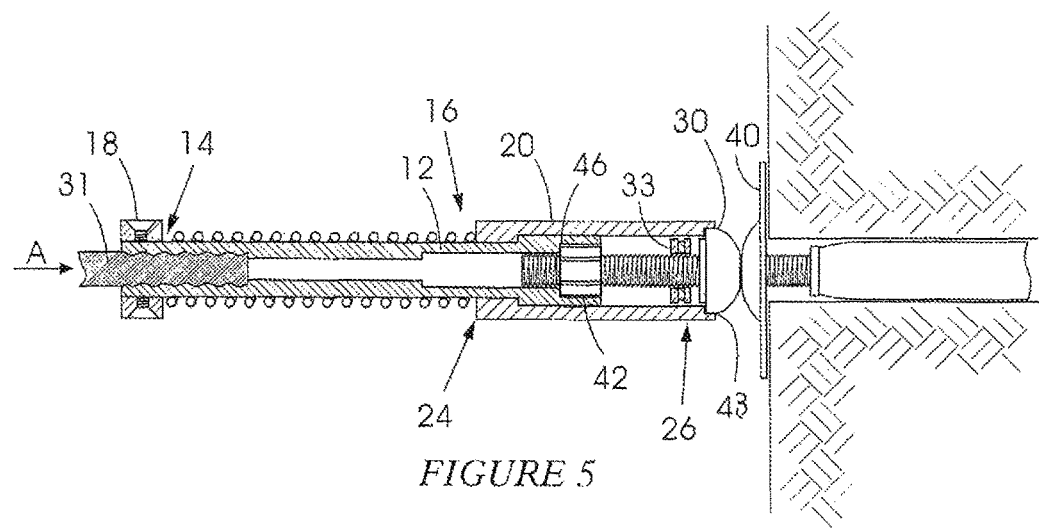
FIG. 5 illustrates the rock bolt installation tool of FIG. 4 engaged with a domed face plate.
Figure 6:
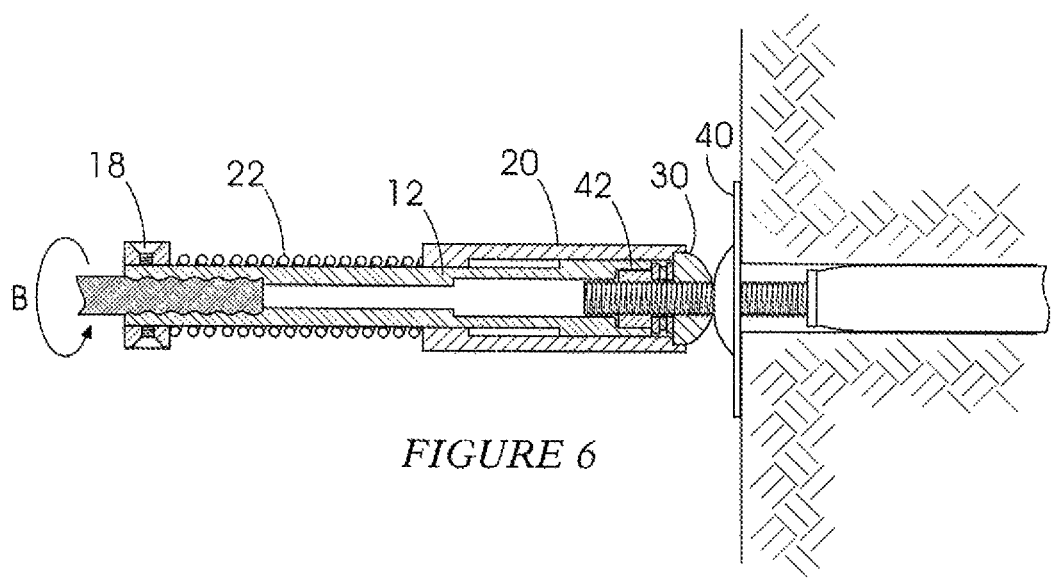
FIGS. 6 and 7 illustrate a rock bolt installation tool, partially sectioned, in a retracted second position.

The rock bolt 34 is inserted into the rock hole 36 by the application of percussive force to the back of surface 37 of the nut 42 by the drive means 29 of drill rig in an axial direction shown by the arrow in FIGS. 4 and 5. This force causes the shaft to move forward relatively to the sleeve 20 and, in doing so, the nut 42 is urged towards the spherical seat 30 as illustrated in FIG. 6.

Placing the driving force behind the greater surface area provided by the nut 42 ensures that the force applied by the drive means 29 is not concentrated on the trailing end of the bolt 34. This reduces the risk of the bolt bending or yielding under force. Furthermore, the movement of the rock bolt 34 into the rock hole is guided in axial alignment by the cantilevered support provided by the tool 10 at the axial locations of the first and second seats (46, 48). Thus the risk of bending is further reduced.

Figure 7:
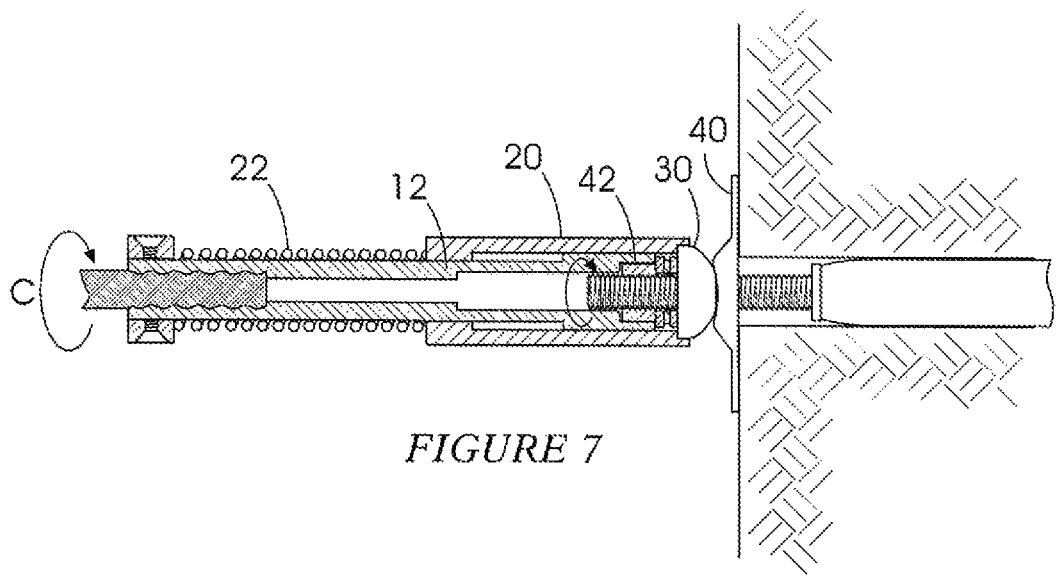

Finally, as illustrated in FIG. 7, the nut 42 connects to the spherical seat 30, via the load indicator 33, and the spherical seat 30 engages an outer surface of the domed faceplate 40 which in that is forced against the rock face 38. With the insertion of the rock bolt complete, the drive means switches from axial drive to rotational drive. The application of rotational drive arrow B (FIG. 6) on the nut 42 torques the nut against the lead indicator and spherical seat 30 to preload the rock bolt by actuating an expansion element (not shown) of the rock bolt 34 which friction fits the rock bolt 34 within the rock hole 36.

The invention claimed is:

1. A rock anchor installation tool, comprising:
    a drive shaft having a proximal end, which is adapted to engage with a drilling rig, and a distal end which includes a recess which is adapted to receive a trailing end portion of a rock bolt and which has a first seat against which an axially pre-set component of a rock anchor assembly abuts, wherein said axially pre-set component is a nut; and
    a tubular sleeve telescopically engaged with the shaft which has a first end, which is adapted to receive an axially moveable component of the rock anchor assembly and which has a second seat against which the axially moveable component abuts, and a second end, wherein the sleeve is reciprocally moveable relatively to the shaft between a biased forward position in which the axially pre-set component and the axially moveable component are spaced, and a retracted second position in which the axially pre-set component engages or connects to the axially moveable component.

2. The rock anchor installation tool according to claim 1, wherein the distal end of the drive shaft is adapted with a threaded male or female section.

3. The rock anchor installation tool according to claim 1, wherein the axially moveable component is a spherical seat.

4. The rock anchor installation tool according to claim 1, wherein a spring is interposed between a stop element on the drive shaft and the second end of the sleeve.

5. The rock anchor installation tool according to claim 3, wherein a spring is interposed between a stop element on the drive shaft and the second end of the sleeve.

6. The rock anchor installation tool according to claim 3, wherein the distal end of the drive shaft is adapted with a threaded male or female section.

7. The rock anchor installation tool according to claim 4, wherein the distal end of the drive shaft is adapted with a threaded male or female section.

8. The rock anchor installation tool according to claim 5, wherein the distal end of the drive shaft is adapted with a threaded male or female section.

9. The rock anchor installation tool according to claim 1, wherein the recess is adapted in a hex shape to receive a hex shaped nut.

10. A rock anchor installation tool, comprising:
    a drive shaft having a proximal end, which is adapted to engage with a drilling rig, and a distal end which includes a recess which is adapted to receive a trailing end portion of a rock bolt and which has a first seat against which an axially pre-set component of a rock anchor assembly abuts; and
    a tubular sleeve telescopically engaged with the shaft which has a first end, which is adapted to receive an axially moveable component of the rock anchor assembly and which has a second seat against which the axially moveable component abuts, and a second end, wherein the sleeve is reciprocally moveable relatively to the shaft between a biased forward position in which the axially pre-set component and the axially moveable component are spaced, and a retracted second position in which the axially pre-set component engages or connects to the axially moveable component, and
    wherein the axially moveable component is a spherical seat.

11. The rock anchor installation tool according to claim 10, wherein a spring is interposed between a stop element on the drive shaft and the second end of the sleeve.

12. The rock anchor installation tool according to claim 10, wherein the distal end of the drive shaft is adapted with a threaded male or female section.

13. The rock anchor installation tool according to claim 11, wherein the distal end of the drive shaft is adapted with a threaded male or female section.

14. The rock anchor installation tool according to claim 10, wherein the recess is adapted in a hex shape to receive a hex shaped nut.

15. A rock anchor installation tool, comprising:
    a drive shaft having a proximal end, which is adapted to engage with a drilling rig, and a distal end which includes a recess which is adapted to receive a trailing end portion of a rock bolt and which has a first seat against which an axially pre-set component of a rock anchor assembly abuts; and
    a tubular sleeve telescopically engaged with the shaft which has a first end, which is adapted to receive an axially moveable component of the rock anchor assembly and which has a second seat against which the axially moveable component abuts, and a second end, wherein the sleeve is reciprocally moveable relatively to the shaft between a biased forward position in which the axially pre-set component and the axially moveable component are spaced, and a retracted second position in which the axially pre-set component engages or connects to the axially moveable component, and
    wherein a spring is interposed between a stop element on the drive shaft and the second end of the sleeve.

16. The rock anchor installation tool according to claim 15, wherein the distal end of the drive shaft is adapted with a threaded male or female section.

17. The rock anchor installation tool according to claim 15, wherein the recess is adapted in a hex shape to receive a hex shaped nut.

18. A rock anchor installation tool, comprising:
    a drive shaft having a proximal end, which is adapted to engage with a drilling rig, and a distal end which includes a recess which is adapted to receive a trailing end portion of a rock bolt and which has a first seat against which an axially pre-set component of a rock anchor assembly abuts; and
    a tubular sleeve telescopically engaged with the shaft which has a first end, which is adapted to receive an axially moveable component of the rock anchor assembly and which has a second seat against which the axially moveable component abuts, and a second end, wherein the sleeve is reciprocally moveable relatively to the shaft between a biased forward position in which the axially pre-set component and the axially moveable component are spaced, and a retracted second position in which the axially pre-set component engages or connects to the axially moveable component, and wherein the recess is adapted in a hex shape to receive a hex shaped nut.

\* \* \* \* \*